United States Patent
Birru et al.

(10) Patent No.: US 9,577,863 B2
(45) Date of Patent: Feb. 21, 2017

(54) SYSTEM AND METHOD FOR IMPROVED FREQUENCY/PHASE ERROR TRACKING IN HIGH-SPEED HIGH-FREQUENCY COMMUNICATION

(75) Inventors: Dagnachew Birru, Yorktown Heights, NY (US); Seyed-Alireza Seyedi-Esfahani, Fairport, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1700 days.

(21) Appl. No.: 12/522,932

(22) PCT Filed: Jan. 15, 2008

(86) PCT No.: PCT/IB2008/050134
§ 371 (c)(1),
(2), (4) Date: Jul. 13, 2009

(87) PCT Pub. No.: WO2008/087590
PCT Pub. Date: Jul. 24, 2008

(65) Prior Publication Data
US 2010/0002757 A1    Jan. 7, 2010

Related U.S. Application Data

(60) Provisional application No. 60/885,137, filed on Jan. 16, 2007.

(51) Int. Cl.
*H04B 1/38*    (2015.01)
*H04N 7/167*    (2011.01)
(Continued)

(52) U.S. Cl.
CPC .......... *H04L 27/2657* (2013.01); *H04B 1/62* (2013.01); *H04L 27/2692* (2013.01);
(Continued)

(58) Field of Classification Search
CPC ............. H04L 27/2613; H04L 27/2671; H04L 27/2672; H04L 25/0202; H04L 27/2627; H04L 5/0085
(Continued)

(56) References Cited

U.S. PATENT DOCUMENTS 4,237,496 A * 12/1980 De Niet .............. G11B 20/1411
360/40
4,679,243 A * 7/1987 McGeehan ............. H04L 27/02
370/480

(Continued)

OTHER PUBLICATIONS

H. Witschnig et al., A Different look on Cyclic Prefix for SC/FDE, Personal, Indoor and Mobile radio Communications, 2002, The 13th IEEE International Symposium on Sep. 15-18, 2002, pp. 824-828, XP010614340.

(Continued)

*Primary Examiner* — Sarah Hassan
(74) *Attorney, Agent, or Firm* — Larry Liberchuk

(57) ABSTRACT

A single carrier modulation scheme suitable for use in high frequency communication systems is provided that achieves improved residual frequency error and phase noise estimation. At a transmitter, cyclically orthogonal constant amplitude pilot signals are inserted at the beginning (or end) of a plurality of SCBT blocks of a block coded data stream. At a receiver, a phase rotation of the received data stream is determined to remove a residual frequency error or to estimate the phase noise.

17 Claims, 4 Drawing Sheets

(51) Int. Cl.
*H04L 27/26* (2006.01)
*H04B 1/62* (2006.01)
*H04L 5/00* (2006.01)

(52) U.S. Cl.
CPC .......... *H04L 5/0007* (2013.01); *H04L 5/0048* (2013.01); *H04L 27/2607* (2013.01)

(58) Field of Classification Search
USPC .......................................... 375/222; 380/205
See application file for complete search history.

(56) References Cited

U.S. PATENT DOCUMENTS

| | | | | |
|---|---|---|---|---|
| 5,249,202 | A * | 9/1993 | Hillum .................... | H04B 1/68 375/321 |
| 6,091,822 | A * | 7/2000 | Mellows ................ | H04N 5/913 380/205 |
| 6,785,351 | B1 * | 8/2004 | Qiu ..................... | H04L 27/0014 375/227 |
| 6,826,169 | B1 * | 11/2004 | Nagatani et al. ............. | 370/342 |
| 6,947,530 | B1 * | 9/2005 | Barsoum ..................... | 379/93.08 |
| 2001/0004383 | A1 * | 6/2001 | Nordstrom .............. | H04B 1/62 375/222 |
| 2004/0047435 | A1 * | 3/2004 | Su ......................... | H04L 25/025 375/316 |
| 2004/0076239 | A1 | 4/2004 | Yu | |
| 2004/0120274 | A1 * | 6/2004 | Petre ........................ | H04B 7/04 370/320 |
| 2004/0151109 | A1 * | 8/2004 | Batra .................... | H04B 1/7163 370/208 |
| 2005/0015818 | A1 * | 1/2005 | Kim ..................... | H04L 1/0041 725/146 |
| 2005/0063298 | A1 * | 3/2005 | Ling ...................... | H04L 5/005 370/208 |
| 2005/0147186 | A1 * | 7/2005 | Funamoto ........... | H04L 27/2605 375/324 |
| 2006/0062318 | A1 * | 3/2006 | Blasco Claret ..... | H04L 27/2602 375/260 |
| 2006/0077887 | A1 * | 4/2006 | Roh ..................... | H04B 1/7176 370/208 |
| 2006/0165128 | A1 * | 7/2006 | Peake et al. .................. | 370/503 |
| 2007/0004465 | A1 * | 1/2007 | Papasakellariou .. | H04W 52/325 455/571 |
| 2007/0092031 | A1 * | 4/2007 | Yu ......................... | H04H 60/11 375/295 |

OTHER PUBLICATIONS

M. Huemer et al., "Unique Word Based Phase Tracking Algorithms for SC/FDE-Systems", Globecom '03, 2003—IEEE Global Telecommunications Conference, Conference Proceedings, vol. 1, Dec. 1, 2003, pp. 70-74, XP010677848.

Luc Deneire et al, "Training Sequence Versus Cyclic Prefix—A New Look on Single Carrier Communication", IEEE Communications Letters, IEEE service Center, vol. 5, No. 7, Jul. 1, 2001, XP011010376.

Andreas Czylwik, "Low Overhead Pilot-Aided Synchronization for Single Carrier Modulation with Frequency Domain Equalization", Institute of Electrical and Electronics Engineers, IEEE Globecom 1998, The Bridge to Global Integration, pp. 2068-2073, XP000894410.

Hyung G. Myung et al., "Single Carrier FDMA for Uplink Wireless Transmission", IEEE Vehicular Technology Magazine, IEEE, US, vol. 1, No. 3, Sep. 1, 2006, pp. 30-38, XP011165321.

* cited by examiner

SYSTEM AND METHOD FOR IMPROVED FREQUENCY/PHASE ERROR TRACKING IN HIGH-SPEED HIGH-FREQUENCY COMMUNICATION

CROSS REFERENCE TO RELATED APPLICATIONS

This application claims the benefit of prior filed, co-pending U.S. provisional application: Ser. No. 60/885,137, filed on Jan. 16, 2007.

BACKGROUND OF THE INVENTION

1. Field of the Invention

The invention relates generally to high speed communications and more particularly, but not exclusively, to a system and method for providing frequency/phase error tracking in a high-speed high-frequency communication system.

2. Description of the Related Art

Using conventional packet structures such as those used for WLANs for high-speed communications at high frequencies such as 60 GHz will not lead to an acceptable estimate of the residual frequency error. This is mainly because conventional packet structures contain a pre-amble sequence only at the beginning of the data. The use of such structures leads to performance that is adequate for lower frequency systems (e.g., 5 GHz) as the expected frequency error will not exceed 200 KHz, (40 ppm). However, using a similar structure will not lead to good performance for higher frequency systems (e.g., 60 GHz). To obtain good performance for higher frequency systems, (i.e., good frequency estimation accuracy), very long preambles are required at the beginning of the packet. Unfortunately, this results in a very inefficient system.

A need therefore exists for a system and method capable of tracking and compensating for high residual frequency error, phase noise and multipath in a high frequency communication system.

SUMMARY OF THE INVENTION

Therefore, the present invention has been made in view of the above problems. Accordingly, the present invention provides a single carrier modulation scheme suitable for use in high frequency communication systems that achieves improved residual frequency error and phase noise estimation. By using cyclically orthogonal constant amplitude pilot signals at the beginning (or end) of one or more SCBT blocks the need for long preambles at the beginning of the packet is precluded.

In an embodiment, a single-carrier block transmission (SCBT) modulation scheme includes a repeated sequence of known (e.g. cyclically orthogonal constant amplitude) pilot signals inserted at the beginning (or end) of one or more SBCT blocks to improve the estimation and tracking of residual errors, such as, for example, frequency errors, phase errors, and short-multipath.

BRIEF DESCRIPTION OF THE DRAWINGS

These and other objects, features and advantages of the invention will be apparent from a consideration of the following Detailed Description Of The Invention considered in conjunction with the drawing Figures, in which.

DETAILED DESCRIPTION OF THE PREFERRED EMBODIMENTS

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail.

Figure 1:
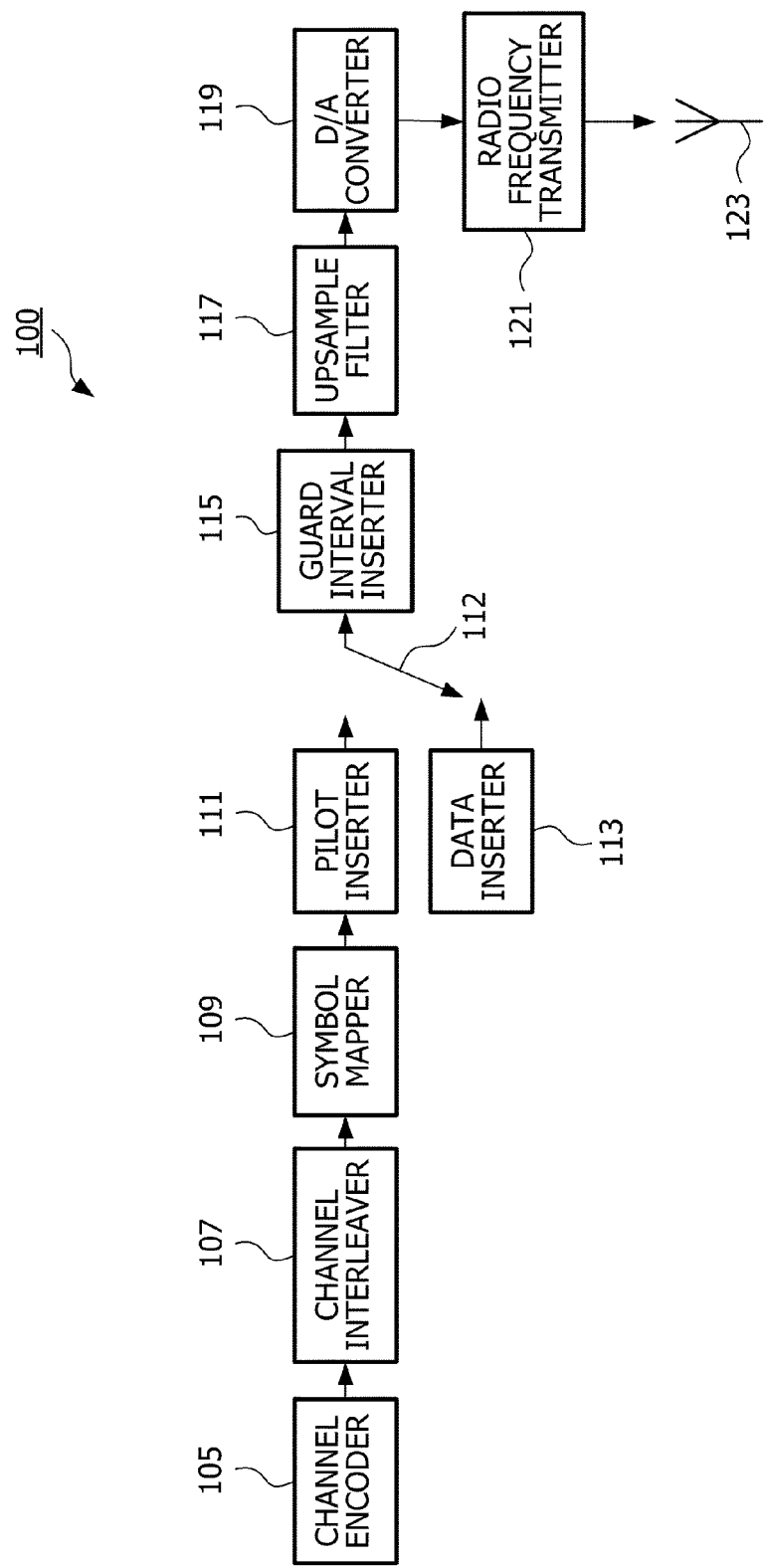
FIG. 1 is a functional block diagram of one embodiment of a data transmitter.

FIG. 1 is a functional block diagram of one embodiment of a data transmitter 100. As will be appreciated by those skilled in the art, the various functions shown in FIG. 1 may be physically implemented using a software-controlled microprocessor, hard-wired logic circuits, or a combination thereof. Also, while the functional blocks are illustrated as being segregated in FIG. 1 for explanation purposes, they may be combined in any physical implementation.

Data transmitter 100 includes a channel encoder 105, a channel interleaver 107, a symbol mapper 109, a pilot inserter 111, a data insertion module 113, a guard interval inserter 115, an upsample filter 117, and a digital-to-analog converter 119.

Channel encoder 105 channel-encodes an input information bit sequence according to a coding method. The channel encoder 105 can be a block encoder, a convolutional encoder, a turbo encoder, or some combination thereof including a concatenated code.

Channel interleaver 107 interleaves the coded data according to an interleaving method. While not shown in FIG. 1, it is clear that a rate matcher including a repeater and a puncturer can reside between the channel encoder 105 and the channel interleaver 107.

The data symbols output from the channel interleaver 107 are sent to a pilot inserter 111, where pilot symbols are inserted among the data symbols. The pilot inserter 111 generates pilot symbols which may be used to facilitate receiver detection of the transmitted signal. A more detailed description of the pilot symbols is discussed further below with reference to FIG. 2. Collectively, the data symbols and pilot symbols are referred to hereinafter simply as symbols. The symbols are passed to a guard interval inserter 115 to add prefixes to the symbols. The signals are then passed through an upsample filter 117, a digital-to-analog converter 121 and a radio frequency (RF) transmitter 121 which transmits SBCT symbols as a signal through a first transmitting antenna 123.

Guard interval inserter 115 includes a multiplexer or switch 112 for selectively providing symbols output from the pilot inserter 111 or other data symbols, for example, from a training sequence.

Figure 2A:
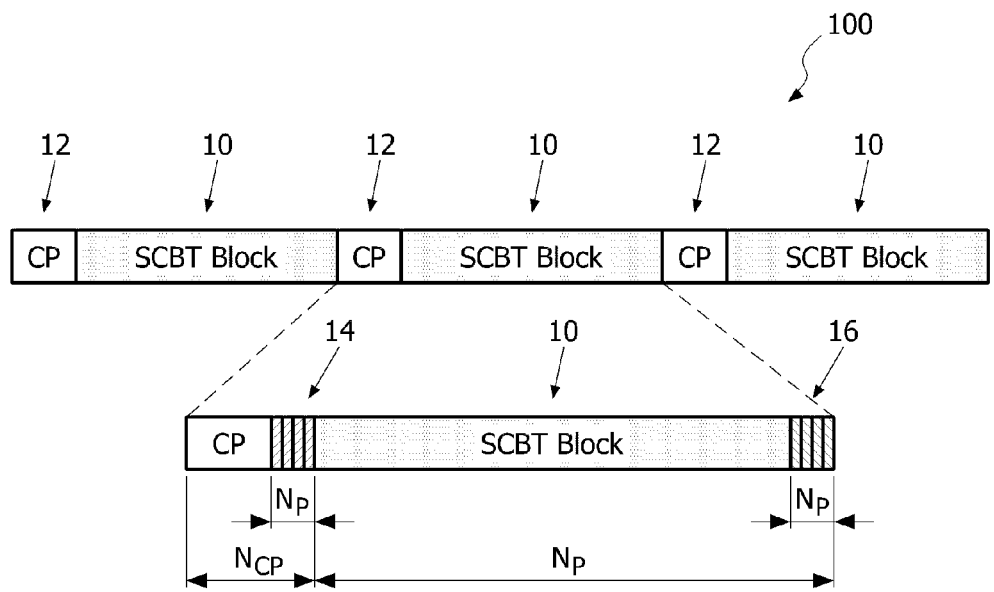
FIGS. 2A & 2B illustrate a packet structure including a short preamble transmitted at a variable rate, according to one embodiment.
Figure 2B:
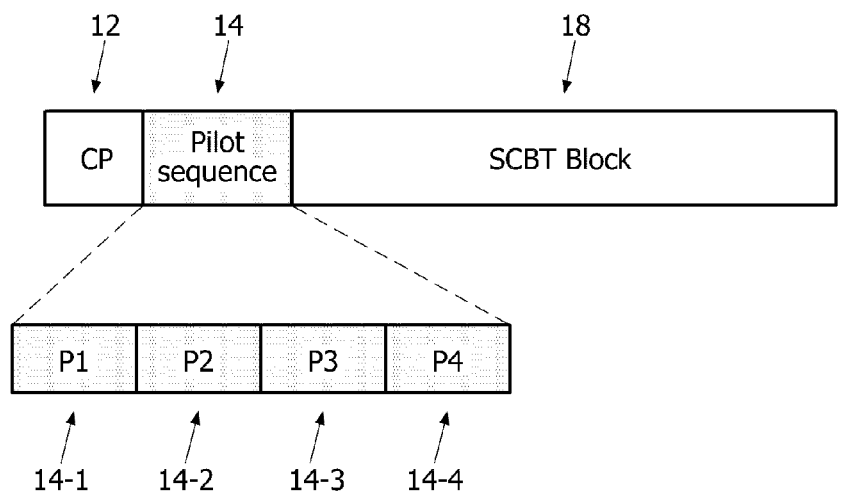

FIGS. 2A and 2B show one embodiment of a structure of a data stream 100 that may be employed in a data transmission of a communication transmitter, such as the data transmitter 100 shown in FIG. 1.

Referring first to FIG. 2A, the data stream structure 100 includes a plurality of SCBT blocks 10. Each SCBT block 10 may optionally include a cyclic prefix (CP) 12 of length $N_{CP}$ appended to the beginning of the block 10.

Each SCBT block 10 of the data stream structure 100 further includes a pilot sequence, appended to the beginning 14 (or end 16) of the block 10. In the case where the pilot sequence is appended to the beginning 14 of the SBCT block 10, it is preferably located between the cyclic prefix (CP) 12 and the payload portion 18 (See FIG. 2B).

Pilot sequence 14 is a key feature of the invention and comprises a predetermined sequence that is designed to facilitate frequency error and phase noise estimation by a data receiver. In some embodiments the pilot sequence 14 is designed to facilitate multipath channel tracking (i.e., short delay spread).

As shown in FIG. 2B, the pilot sequence 14 is comprised of a plurality of identical sub-sequences P1-P4, respectively labeled, 14-1, 14-2, 14-3, 14-4, where each sub-sequence P1-P4 of the pilot sequence 14 is comprised of a cyclically orthogonal constant amplitude sequence of at least one pilot symbol. A pilot sub-sequence is sometimes referred to herein as a simply a pilot "P".

The pilot sequence 14 can be generated in various ways. As one example, the pilot sequence 14 may be generated in accordance with the following equation:

$$P(n = p + N*q) = e^{j(\frac{2\pi r}{N} pq + \alpha)},$$
$$p = 1, \ldots, N$$
$$q = 1, \ldots, N$$

Where r is prime to N, $\alpha$ is a phase offset factor. And N is an integer. This results in the pilot "P" having a sequence of length $N^2$. The pilot sequence 14 is chosen according to an optimal tradeoff between performance and overhead. It should be recognized that while the insertion of a pilot sequence 14 into the data stream facilitates improved residual frequency error and phase noise estimation, it also undesirably contributes to overhead. It is desired to keep the overhead small. Accordingly, the pilot sequence should preferably comprise no more than 5 to 10% of the data stream.

As an example, for N=2, a pilot symbol having a sequence length $N_p$ of 4 is generated as {1 1 1 -1}. The sequence length $N_p$ is largely dependent upon required performance. That is, for a high frequency application (e.g., 60 GHz), 5-10% of the length of an SCBT block 10 is required to obtain satisfactory performance. For example, for an SBCT block 10 having a block length of 256, the length of the pilot sequence 14 is preferably between 5-10% of the block length (e.g., 16 samples). The pilot sequence 14 is preferably structured as a repeated sequence. In the instant example, the pilot sequence 14 having a length of 16 can be structured as four repeating sequences of length 4:

{1, 1, 1, -1}, {1, 1, 1, -1}, {1, 1, 1, -1}, {1, 1, 1, -1}

It should be understood that in some embodiments, less than all of the SCBT blocks 10 may include a pilot sequence 14 by design. For example, in some embodiments every other SCBT block 10 may include a pilot sequence 14. In other embodiments, one-half or one-quarter of the SCBT blocks 10 may include a pilot sequence 14. As will be described below, increasing the percentage of SCBT blocks 10 that include a pilot sequence 14 beneficially serves to enhance the signal to noise ratio. Conversely, lowering the number of SCBT blocks 10 that include a preamble pilot portion 14 serves to decrease the signal to noise ratio.

Referring now to the cyclic prefix (CP) portion 12 of FIGS. 2A and 2B, the use of cyclic prefixes are well known. For example, in an OFDM transmission scheme, a Cyclic Prefix (CP) is added to the head of an OFDM symbol before transmission in order to prevent the possible self-interference caused by a received signal time-delayed through multiple paths. That is, one OFDM symbol is composed of a CP and OFDM data obtained by performing Inverse Fast Fourier Transform (IFFT) on packet data information. The size of the CP is $N_{CP}$ chips, and for CP insertion, an $N_{CP}$ chip signal is copied from the rear of the OFDM data and then inserted in the front of the OFDM data. Therefore, the size of the OFDM data is ($N_{Data}-N_{CP}$) chips. $N_{CP}$ is determined depending on the allowable time delay that causes the self-interference. If $N_{CP}$ is greater, more received signals can be demodulated without interference, but the size of the OFDM data decreases causing a reduction in the possible amount of transmission information. However, if $N_{CP}$ is smaller, the possible amount of transmission information increases, but probability of the self-interference occurring in a severe multipath fading environment increases, causing deterioration of reception quality. Preferably, the length of the cyclic prefix (CP) portion 12 is greater than the delay spread of the channel.

In certain embodiments, the length of the cyclic prefix (CP) portion 12, $N_{CP}$, may be adaptively selected by a receiver. This can occur, in one way by initially selecting a large default value for $N_{CP}$. A number of advantages may be realized by adaptively selecting $N_{CP}$. For example, by adaptively selecting $N_{CP}$, the system attains a high bandwidth efficiency when little or no multipath exists. If a channel is AWGN, or in the case where a receiver has a time-domain equalizer, a zero length $N_{CP}$ can be used. Further advantages which may be realized by using an adaptively selecting $N_{CP}$ include enabling a system to use a reduced $N_{CP}$ length with more robust data modes and allowing for a more flexible receiver design.

In an embodiment where the pilot sequence 16 is appended to the end of the SCBT block 10, as shown in FIG. 2A, beneficially, the inserted pilot sequence 16 is copied into the cyclic prefix (CP) portion 12, at the beginning of the SCBT block 10. This occurs as a result of the manner in which the cyclic prefix (CP) portion 12 is generated from the data portion 16, as is well-known in the art and described above. Beneficially, the incorporation of the pilot sequence both at the beginning and end of an SBCT block 10 results in an improved signal-to-noise ratio at the receiver.

At a receiver, a number of techniques can be employed to estimate the residual frequency error by decoding a data stream encoded to include at least a pilot sequence 14, in the manner described above. For example, at any point in time, the phase rotation as a result of the residual frequency error can be estimated using the following equation:

$$\alpha(n) = \arctan\left[\sum_{m=1}^{N^2} r(nT + mT)P*(m)\right]$$

Where nT is the beginning of an SCBT block 10 following the cyclic prefix (CP) portion 12. The phase of a subsequent block can then be de-rotated to compensate for this estimated error. However, it should be understood that this technique does not provide full correction of the frequency error as it assumes that the frequency error is constant during the duration of a SCBT block 10. Nevertheless, it provides acceptable performance.

Experimental Results

Figure 3:
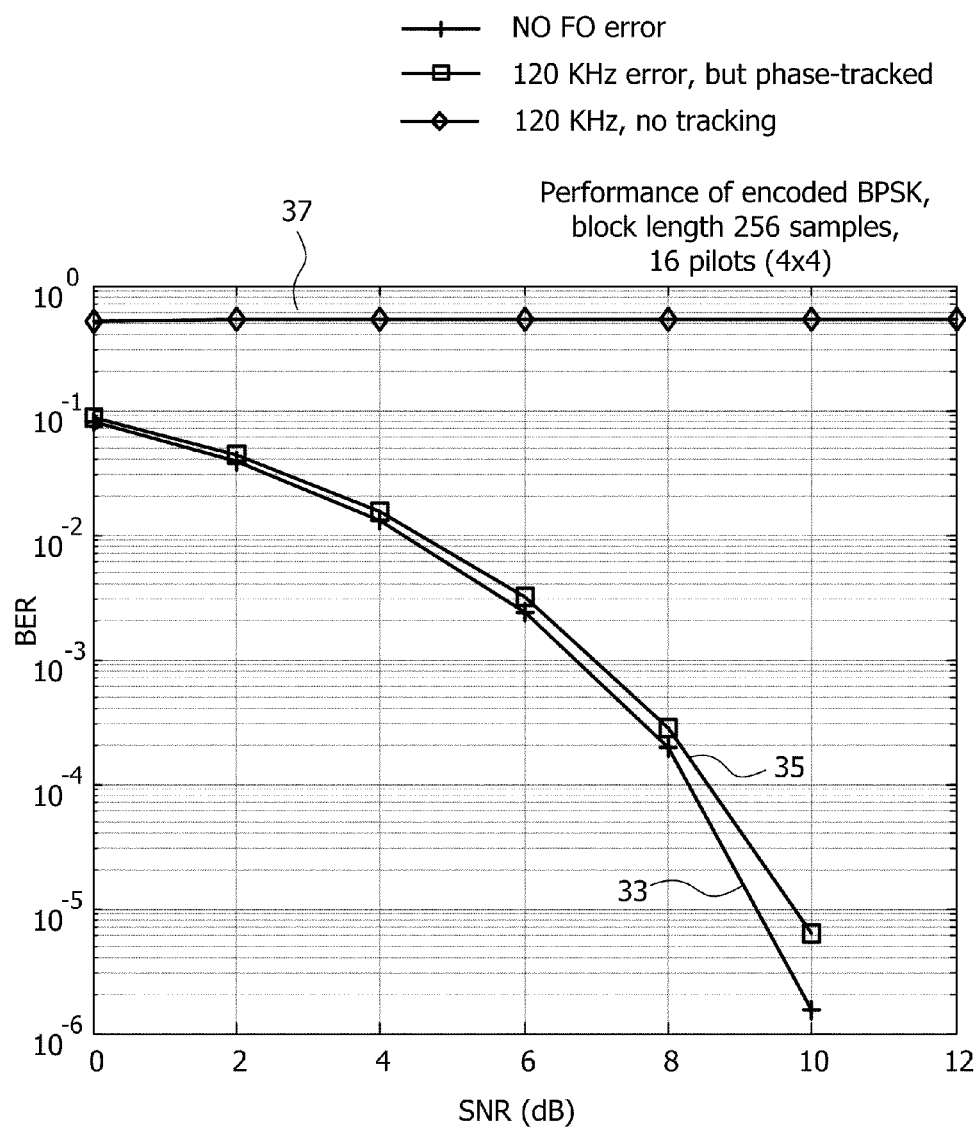
FIG. 3 is an illustration of simulated BER curves for a BPSK scheme in an AWGN channel that utilizes different degrees of phase tracking.
Figure 4:
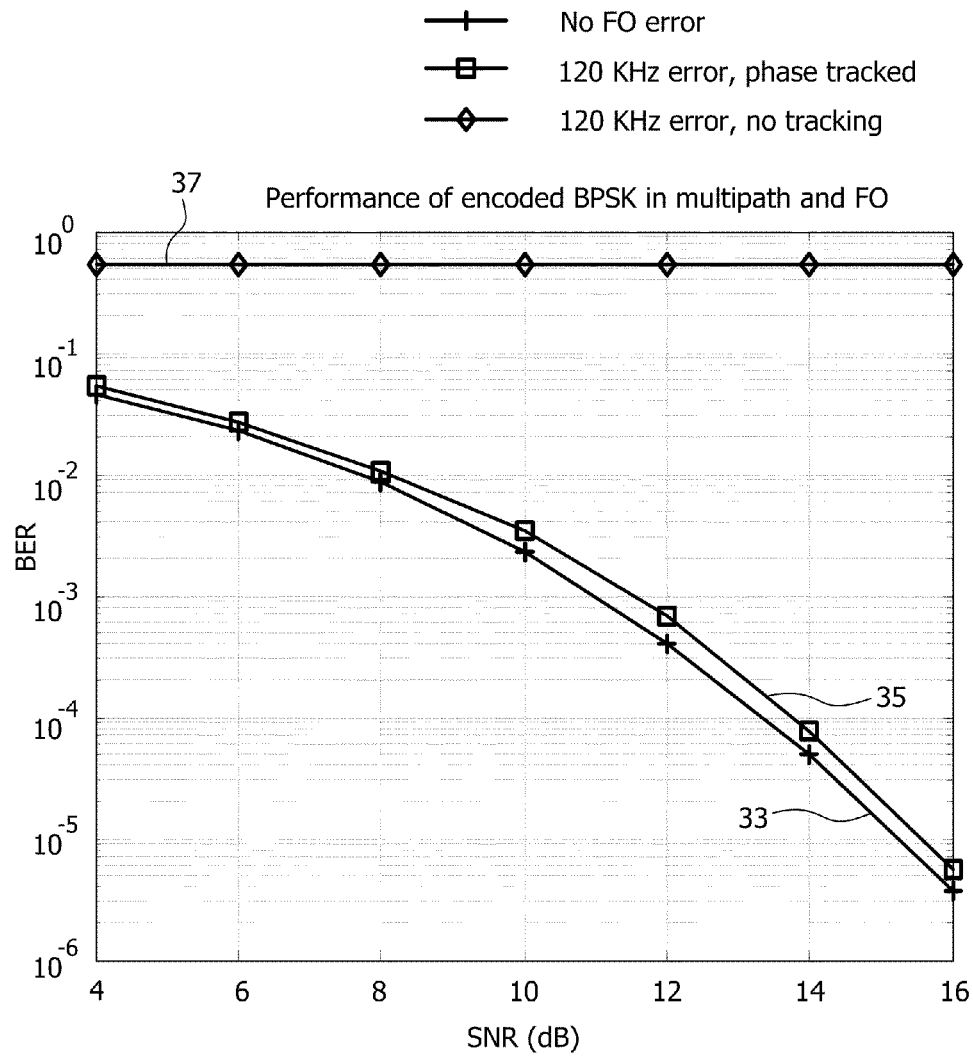
FIG. 4 is an illustration of simulated BER curves for a BPSK scheme in a multipath channel that utilizes different degrees of phase tracking.

FIGS. 3 and 4 illustrate simulation results to evaluate a system with and without performing phase tracking of a frequency offset error, using the receiver configuration discussed above. Each simulation is based on the following parameter values. An AWGN random exponentially decaying channel with 7.5 ns rms delay spread, a sampling rate of 1.4 GHz, a frequency offset of 120 KHz (=2 ppm error at 60 GHz), and a packet length of 128 SCBT blocks. The parameters closely resemble what would be needed for wireless high-speed communications at 60 GHz.

Referring now to FIG. 3, the baseline curve 33 is based on the assumption of having no frequency offset error at the receiver. For this baseline curve 33, the BER is entirely attributable to channel noise. The second curve 35 is based on the invention, whereby a transmission scheme utilizes a cyclic prefix (CP) portion 12 in an SBCT transmission scheme incorporating a cyclic prefix (CP) portion 12 having a length of 16 samples, inserted in at least a portion of the transmitted SBCT blocks. The 16 samples being structured as 4 sequences, where each sequence is comprised of 4 samples, as described above. The simulation output illustrated by the second curve 35 assumes phase-tracking of the 120 KHz frequency offset is performed at the receiver by detecting the cyclic prefix (CP) portion 12. The third curve 37, which is shown as a horizontal line in FIG. 3, assumes that no phase tracking is performed at the receiver at all.

It is observed that for the baseline curve 33, the bit error rate (BER) is shown to improve with increasing SNR, as is typical. The second curve 35 provides a performance level comparable to the ideal baseline curve 33 by incorporating a cyclic prefix (CP) portion 12 in a SBCT transmission scheme. Finally, the third curve 35 illustrates a result not performing any phase tracking at the receiver at all. The BER in this case is 50%.

FIG. 4 illustrates simulation results based on the parameters described above, but also takes into account multipath. It is observed that the inclusion of multipath results in curves 33 (baseline) and 35 (pilot sequence tracking) having slightly more degraded results that what is shown in FIG. 3.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. A method for providing improved frequency and phase error tracking in a high-speed high-frequency communication system, the method comprising:
    performing encoding, interleaving and symbol mapping on a data stream of original information bits to produce a resulting data stream;
    partitioning the resulting data stream into blocks to produce a partitioned data stream, wherein the partitioned data stream is a single-carrier block transmission (SCBT) partitioned data stream;
    inserting a pilot sequence, distinct from a cyclic prefix, into at least two or more blocks of the partitioned data stream, wherein the pilot sequence is inserted into each of the at least two or more blocks at only one of the beginning of each block and the end of each block, and wherein the pilot sequence is a cyclically orthogonal constant-amplitude sequence; and
    modulating and transmitting the partitioned data stream including the inserted pilot sequences using a single carrier modulation and transmission scheme.

2. The method according to claim 1, further comprising:
    receiving the data stream at a receiver;
    determining a phase rotation of the received partitioned data stream by correlating at least a portion of the received data stream with a local copy of the pilot sequence;
    estimating the frequency and phase error; and
    correcting a frequency/phase error of the received partitioned data stream using the estimated frequency and phase error.

3. The method according to claim 1, further comprising adding transmit redundancy to the partitioned data stream prior to transmitting the partitioned data stream.

4. The method according to claim 3, wherein said transmit redundancy comprises the cyclic prefix.

5. The method according to claim 4, wherein a length of said cyclic prefix is adaptively selected by a receiver.

6. The method according to claim 1, wherein a length of the pilot sequence is substantially between 5% and 10% of the length of a given block of said partitioned data stream.

7. The method according to claim 1, wherein said pilot sequence is also inserted at the beginning of each of said at least two blocks of said partitioned data stream when said inserting operation inserts the pilot sequence at the end of each of said at least two blocks.

8. The method according to claim 1, wherein said pilot sequence is also inserted at the end of each of said at least two blocks of said partitioned data stream when said means for inserting inserts the pilot sequence at the beginning of each of said at least two blocks.

9. The method according to claim 1, wherein said cyclically orthogonal constant-amplitude sequence is generated in accordance with the following equation:

$$P(n = p + N*q) = e^{j\left(\frac{2\pi r}{N}pq+\alpha\right)},$$
$$p = 1, \ldots, N$$
$$q = 1, \ldots, N$$

where r is prime to N, α is a phase offset factor, and N is an integer.

10. A data transmitter, comprising:
    an encoder configured to encode a data stream of original information bits, which has been partitioned into blocks as a single-carrier block transmission (SCBT) partitioned data stream, into a coded data stream;
    an interleaver configured to interleave the coded data stream, resulting in an interleaved data stream;
    a symbol mapper configured to map symbols onto the interleaved data stream, resulting in a symbol-mapped data stream; and
    a pilot inserter configured to insert a pilot sequence, distinct from a cyclic prefix, into at least two or more blocks of the symbol-mapped data stream, wherein the pilot sequence is inserted into each of the at least two or more blocks at only one of the beginning of each block and the end of each block, and wherein the pilot sequence is a cyclically orthogonal constant-amplitude sequence;

wherein the data transmitter is configured to modulate and transmit the symbol-mapped data stream including the inserted pilot sequences using a single carrier modulation and transmission scheme.

11. The data transmitter according to claim 10, wherein transmit redundancy is added prior to transmitting the partitioned data stream.

12. The data transmitter according to claim 11, wherein said transmit redundancy comprises the cyclic prefix.

13. The data transmitter according to claim 12, wherein a length of said cyclic prefix is adaptively selected by a receiver.

14. The data transmitter according to claim 10, wherein a length of the pilot sequence is substantially between 5% and 10% of the length of a given block of said partitioned data stream.

15. The data transmitter according to claim 10, wherein said pilot sequence is also inserted at the beginning of each of said at least two blocks of said partitioned data stream when said means for inserting inserts the pilot sequence at the end of each of said at least two blocks.

16. The data transmitter according to claim 10, wherein said pilot sequence is also inserted at the end of each of said at least two blocks of said partitioned data stream when said means for inserting inserts the pilot sequence at the beginning of each of said at least two blocks.

17. The data transmitter according to claim 10, wherein said cyclically orthogonal constant-amplitude sequence is generated in accordance with the following equation:

$$P(n = p + N*q) = e^{j\left(\frac{2\pi r}{N}pq+\alpha\right)},$$
$$p = 1, \ldots, N$$
$$q = 1, \ldots, N$$

where r is prime to N, $\alpha$ is a phase offset factor, and N is an integer.

* * * * *